May 19, 1936.　　　　R. L. COOPER　　　2,041,458
ILLUMINATION CONTROL SYSTEM
Filed Sept. 17, 1935　　4 Sheets-Sheet 1
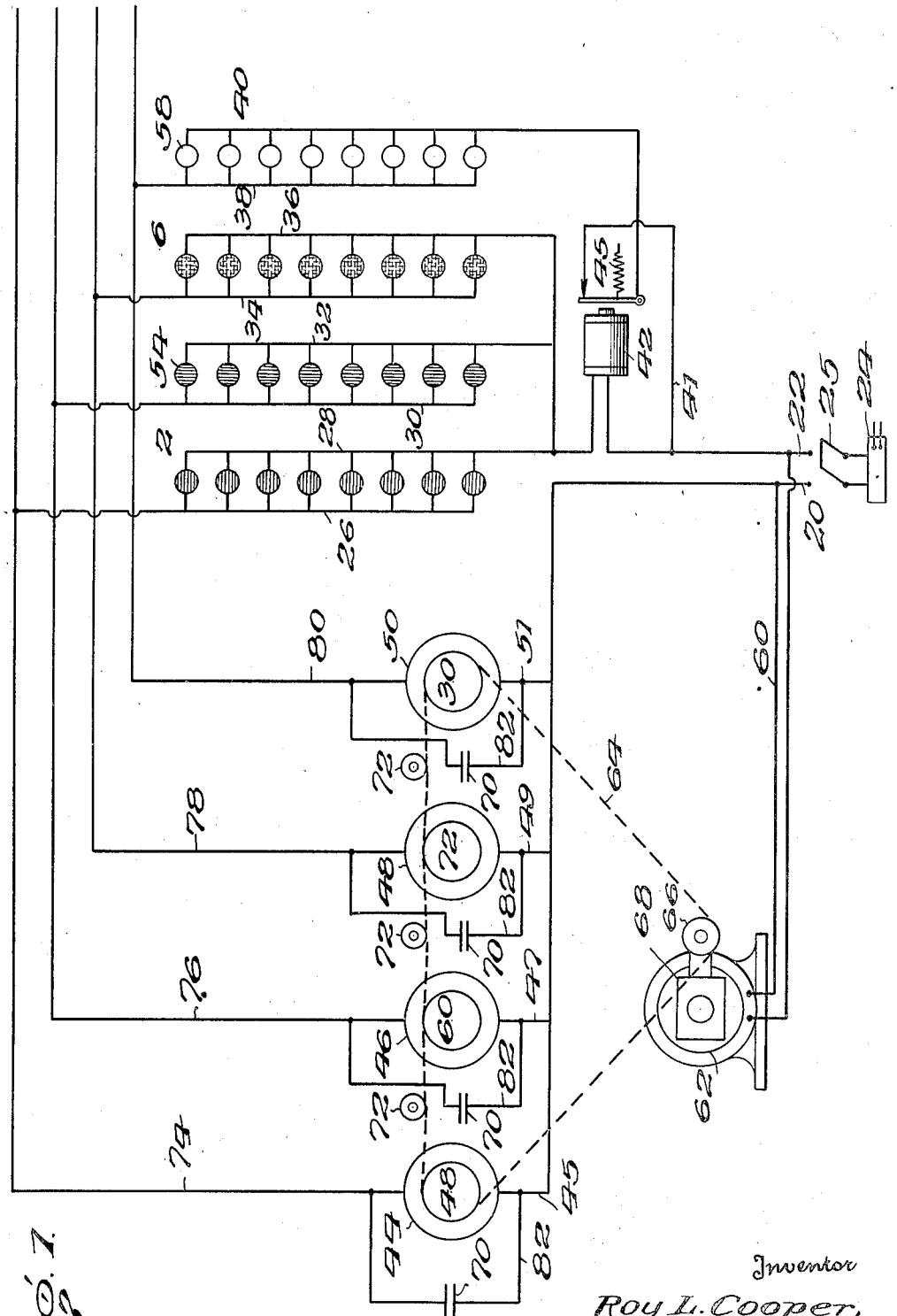
Inventor
Roy L. Cooper,
By John L. Woodward
Attorney

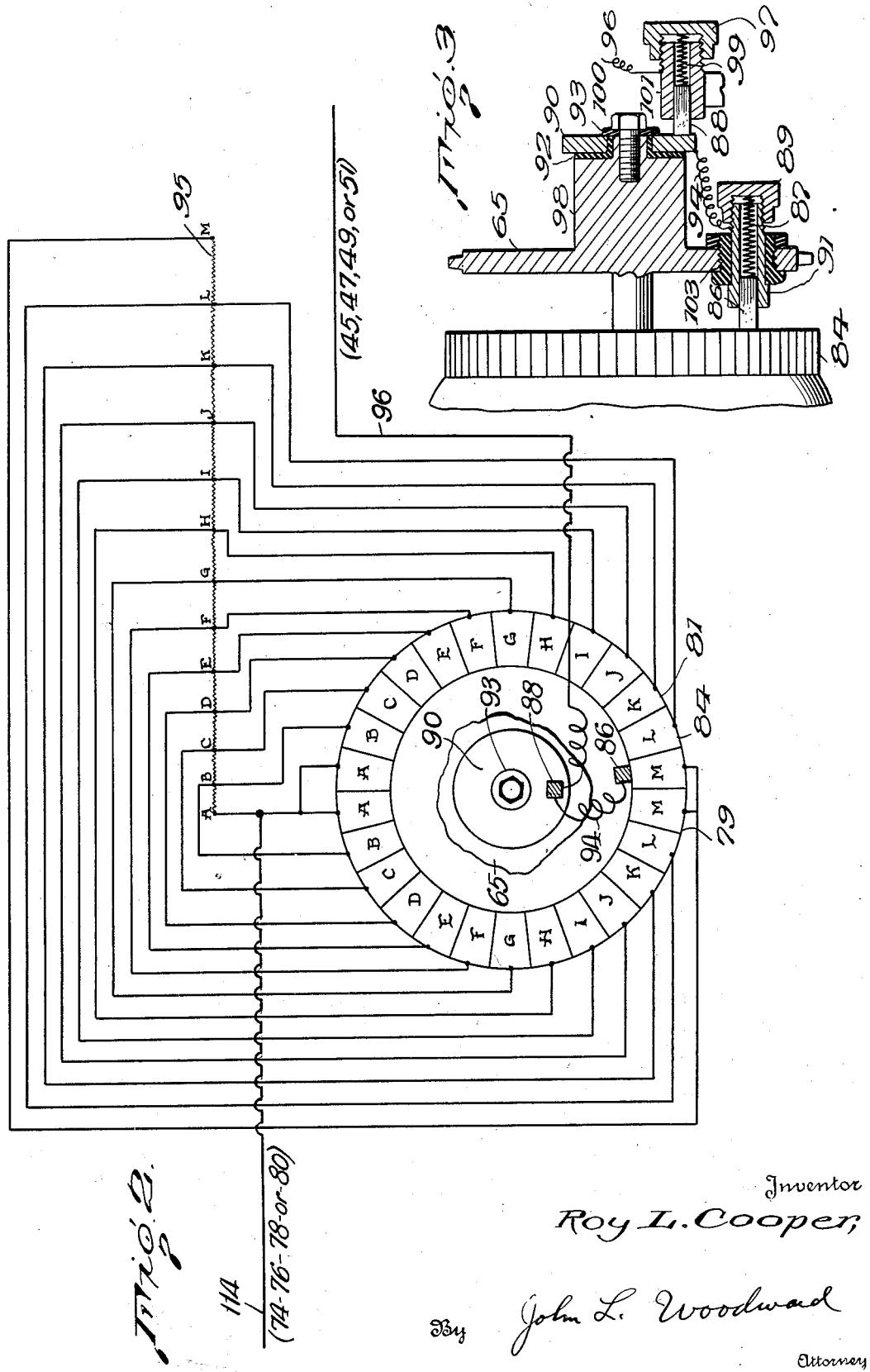

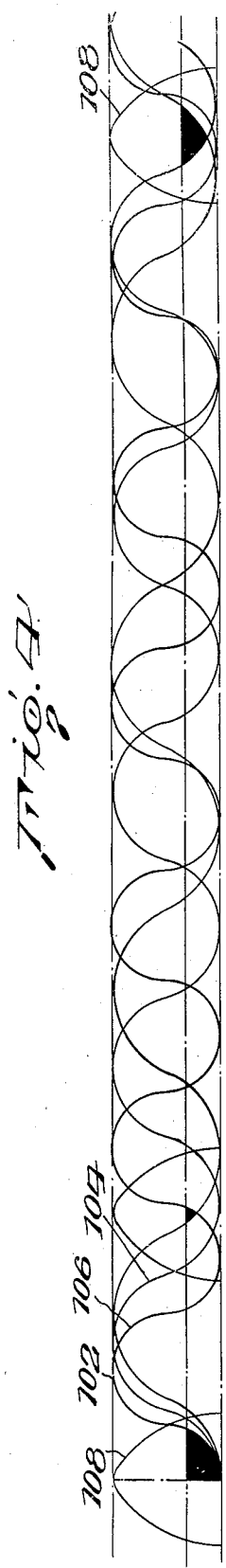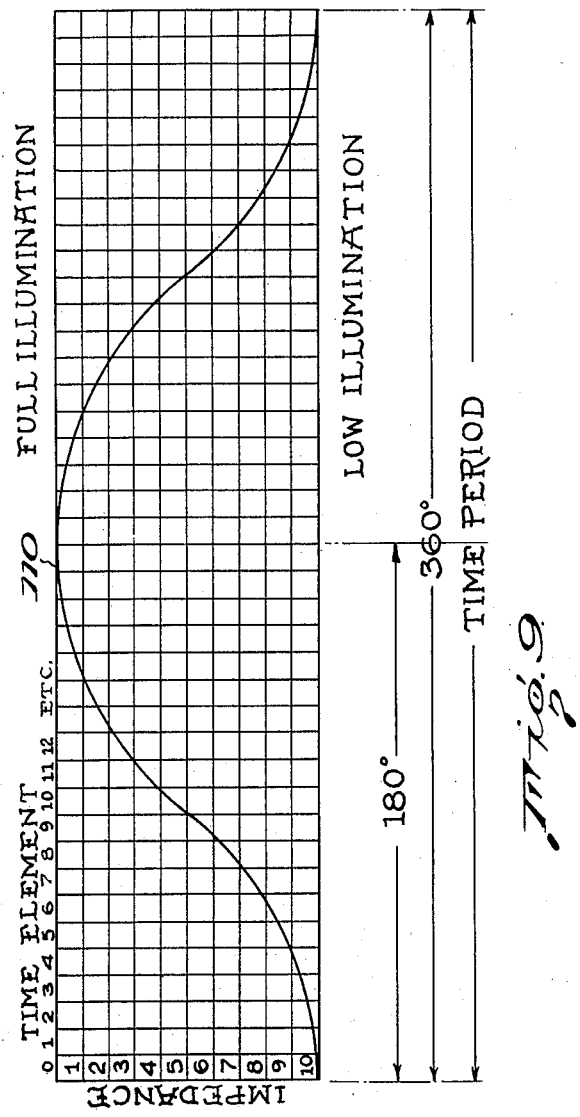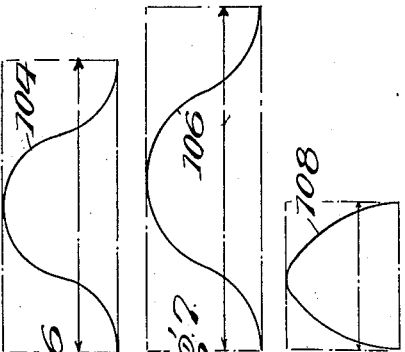

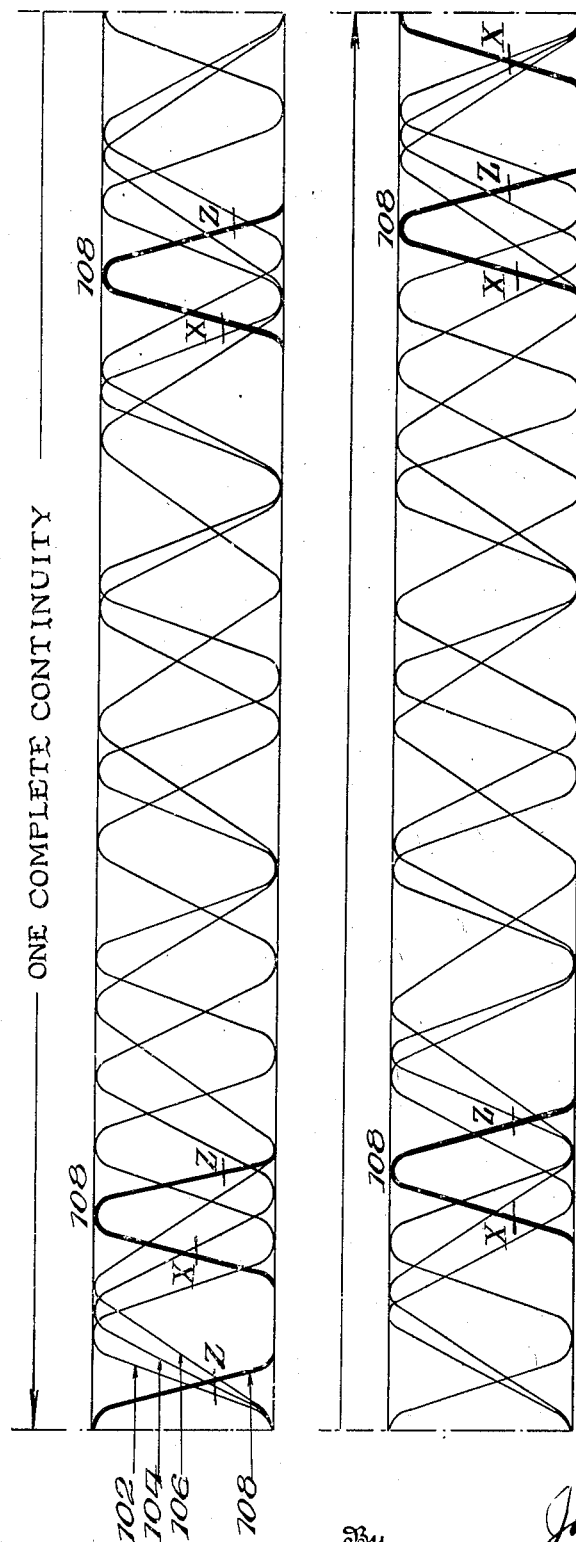

Patented May 19, 1936

2,041,458

UNITED STATES PATENT OFFICE 2,041,458

ILLUMINATION CONTROL SYSTEM

Roy L. Cooper, Hammond, Ind., assignor to Colorflex Corporation, Hammond, Ind.

Application September 17, 1935, Serial No. 40,986

6 Claims. (Cl. 177—346)

This invention relates, generally, to current controlling systems and more particularly to systems for controlling the current to color lights as applied to electric signs, flood lights, stage effects, window displays and the like, and which is a simple, inexpensive and reliable control system.

More specifically the invention relates to a method of controlling colored electric lights, whereby the primary colors or any color lights may be automatically and continuously blended to produce the most pleasing effects and delicate shades, and wherein the color effects may be produced in a predetermined and automatically controlled continuity.

This invention embodies a multiplicity of rheostats of novel construction which are actuated at respectively diffcrent speeds whereby the color light circuits are automatically blended in a manner, one application of which is indicated by the appended chart. In this construction of the rheostats, the resistance stages are connected to the segments of the commutator in a system which permits a rotary motion of the brushes thereof, thus producing a reversal of resistance at each 180 degrees of rotation. The commutators in this adaptation are stationary while the brushes are actuated in a rotary motion.

I propose the utilization of various devices of novel construction and in novel arrangement which specifically produce the desired results both economically and practically.

An object of this invention is to provide automatic, predetermined and operable means of actuating a multiplicity of resistance devices, whereby the illuminating intensities of a multiplicity of light circuits may be simultaneously changed from any values to any other desired values, respectively, the amount of change in any circuit or group of circuits being independent of the change in every other circuit or groups of circuits, and the respective rates of change being at all times proportional to the rate of movement of the actuating element.

Another of the invention's objects is to provide simple and reliable automatic means for the accomplishment of the aforesaid desirable results.

Another object of the invention is to provide automatic, operable control means in a novel system of the aforesaid character, which is extremely flexible in character as to any desired predetermination of combinations and sequences, whereby a practically unlimited sequence of illumination control sequences may be effected.

Another and more specific object is to supply novel and operable means of predetermining the sequence of combinations of light intensities in respect to the time of cycles of the component circuits, the variation and intensities of the component circuits, and the total time in completing a sequence of all the possible combinations of light intensities of a complete continuity.

Another object of the invention is the utilization of a mechanism adapted to the automatic control and which is actuated by an electric motor whereby the fluctuation of illumination of the various circuits is accomplished in such a manner as to produce a continuity of light combinations of the different circuits for the purpose of producing a blending of the different light colors, and thereby a continuity of composition of light colors whereby all possible combinations of the colored lights are produced.

Another object of this invention is the utilization of means of controlling a plurality of light circuits wherein a progressive and continuous blending of the component colors of light will be produced in every possible intensity of illumination of the various component colors, and to which is added a supplementary circuit controlled by suitable means, whereby a cycle of white illumination is automatically produced at any time the composite illumination of the various color circuits falls below a predetermined stage of insufficient illumination.

Another object of the invention is a novel and automatic means of actuating various resistance devices, whereby all possible color combinations are produced in continuous blending of the component colors in which all points of insufficient illumination of the continuity are supplemented by the automatic interspersal of predetermined cycles of light.

The general adaptation of the invention includes the employment of light circuits connected in parallel. Each of the light circuits has a resistance device in its circuit. In one adaptation, three of the light circuits correspond to the primary colors; namely, red, blue and yellow. A fourth or supplemental light circuit is a white light circuit and is adapted to be cut in by a conventional relay when the electric current of the three primary color circuits fall below a predetermined stage.

Heretofore, in color effects of this sort, it has been the custom to allow the display to be poorly illuminated at the point of low color intensities thereby detracting from the effectiveness of the display. Therefore I have added to this invention a means whereby this fault is corrected. I accomplish this by the addition of a bank of lights which are preferably of the type known as daylight white. In the use of these lights, the display is never poorly illuminated. The effectiveness of the colors are enhanced by contrast with the occasional infusion of the white lights into the otherwise colored display. The white light circuit is controlled by an impedance device operated at twice the speed of the intermediate speed color circuit and which also has in its circuit the contact of the conventional relay to turn on the white bank of lamps when the total illumination of the colored light circuits fall below the point of desired illumination.

The novel features that I consider characteristic of my invention are set forth with particularity in the appended claims. The invention itself, however, both as to its organization and its method of operation, together with additional objects and advantages thereof, will be best understood from the following description of the specific embodiment when read in connection with the accompanying drawings in which:

Figure 1 is a diagrammatic representation of a system of control for groups of lamps embodying my invention;

Figure 2 is a diagrammatic view of one of the impedance devices of the control system which discloses the different stages of resistances;

Figure 3 is a side view of one of the commutators of the impedance devices and particularly showing its rotary and stationary pick up brushes;

Figure 4 is a diagram showing the cycle fluctuation of the four light circuits;

Figure 5 is a diagram disclosing the cycle of the rheostat of the first color circuit;

Figure 6 discloses a cycle of the rheostat of the second color circuit;

Figure 7 discloses a cycle of the rheostat of the third color circuit;

Figure 8 discloses a cycle of the rheostat of the fourth or white circuit;

Figure 9 is another showing of one cycle of one of the rheostats on a larger scale, showing the method of plotting the wave and adapting impedance thereto to produce a corresponding fluctuation of illumination;

Figure 10 is a diagram showing a complete continuity of the fluctuations of the color circuits, and the interspersal of the fluctuations of the white light circuit when the composite fluctuations of the color circuits have fallen below predetermined current values.

Referring now to Figure 1 which shows a diagrammatic representation of my general adaptation of the system of control for the lamp circuits, in which 20 and 22 represents the conductors leading from the current source. The current is passed through a filter 24 which is especially adapted for the elimination of radio interference. Conductor 22 is attached to the three banks of lamps 52, 54 and 56 through the conductors 28, 32 and 36. The current at all times passes from the bank of lamps 52, 54 and 56 through a relay 42 to the conductor 22. When the sum of the current in the light circuits 26—28, 30—32 and 34—36 falls below a predetermined value, the relay switch is closed thereby connecting the conductor 22 to the bank of lamps 58 in the light circuit 38—40. There is a conductor 41 which passes through the relay switch 45 to the bank of white lights 58. The relay switch 45 remains open in relation to the conductor 40 at all times when the sum of current values of the circuits 26—28, 30—32 and 34—36 are high enough to overcome the spring tension in the relay switch 45. When relay switch 45 closes it completes an external circuit. This circuit is connected to the plurality of white lamps 58 and which is in parallel with the plurality of colored lamps 52, 54 and 56.

The conductor 20 is connected to the impedance devices 44, 46, 48 and 50 through conductors 45, 47, 49 and 51 which control the fluctuation of the current to the light circuits 26—28, 30—32, 34—36 and 38—40 respectively. An electric motor 62 is connected to the conductors 20 and 22 by conductors 60. The electric motor 62 has a gearing reduction 68. A sprocket chain 64 is connected to the sprocket gear 66 of the reduction gearing 68 and is adapted to be also geared to the sprockets for each rheostat device. The electric motor actuates the rheostat devices 44, 46, 48 and 50 through the sprocket chain 64. The rheostat devices 44, 46, 48 and 50 are connected by conductors 74, 76, 78 and 80 to the bank of lamps 52, 54, 56 and 58 through the conductors 26, 30, 34 and 38 respectively. Each impedance device has a condenser 70 connected in shunt 82 to prevent the arcing at the points of break of the brush on the segments of the commutators. Three idler sprockets 72 are employed to keep the sprocket chain in contact with the sprocket wheels of the impedance devices.

Figure 2 is a diagrammatic view of one of the impedance devices of the control system shown in Figure 1 which discloses the different stages of resistance. This illustration of the rheostat shows the method of attaching the various impedance steps which in this method of construction allows a rotary motion of the pick up brush upon the commutator thereof and results in a reciprocating action in the resultant impedance. The commutator 84 of the rheostat is shown divided into two sections 79 and 81 of 180 degrees each. Each section of the commutator is shown having the same number of segments. I have found that 60 segments, thirty for each section produces the best results. That is, thirty stages of resistance drop and thirty stages of resistance rise will produce very smooth fluctuation of the light intensity. A designates the lowest stage of resistance in each section of the commutator while M designates the highest stage of resistance in each section. Each connection to the resistance line 95 is connected to two segments of the commutator, one segment in each section, and in each case the segments occupy the same relative position clockwise and counterclockwise relative to the initial end connection of the resistance. The resistance steps in line 95 are calibrated, each successive step being of greater resistance than the previous step so that the desired illumination is produced in the light circuit.

Figure 3 discloses a side view of the rheostat type of impedance which shows the manner in which the rotary brush 86 is actuated. The motor 62 operates sprocket chain 64 which actuates the sprocket gear 65 thereby rotating brush carrier 91 which carries the rotary brush over the segments of the commutator 84. The rotary brush 86 is adapted to be adjusted by turning the screw threaded cap 89 which actuates the spring 87 against the brush. The take off ring 90 is attached to take off bearing 98 by bolt 100, and take off ring 90 is insulated at 92 and 93. The stationary pick up brush 88 is mounted in a carrier 101 and the stationary brush is adjusted by means of the screw cap 97 and spring 99. The rotary brush 86 is connected to the pick up ring 90 through a conductor 94. Conductor 96 indicates the line to one of the light circuits. The other lead 114 is to be made at A in Figure 2.

Each of the devices 44, 46, 48 and 50 have commutators of similar construction to the one as shown in Figure 2. Each of these brushes have sprocket gears of different sizes thereby the speed of rotation of the various gears will vary inversely as their diameters. The difference in the speed of the rotary brushes 86 for these rheostats may be any suitable difference. I find that when these rheostats operate in a relation of 4 to 5 to 6, that the best results are accomplished, although any other satisfactory ratio may be employed. In this particular construction of the sprocket gears; the sprocket gear for rheostat 44 has 48 teeth, the sprocket for rheostat 46 has 60 teeth, and the sprocket for rheostat 48 has 72 teeth. The rheostats 44, 46 and 48 are the control means for the color light circuits. These rheostats 44, 46 and 48 are therefore operated at the different speeds so that the primary colors, red, blue and yellow, may be controlled in a manner which will cause them to be blended in all possible shades. When the speed of the brushes for the three rheostats 44, 46 and 48 for the respective color circuits 26—28, 30—32 and 34—36 is increased, the time will be less for making a complete cycle of all color combinations. If the color combinations follow consecutively in rapid order, the effect is disconcerting. It has been found most satisfactory to complete the continuity within a range of from five to twenty minutes. During the completion of a complete cycle or continuity for the three color light circuits 26—28, 30—32 and 34—36, there will be times when all of the three color illumination intensities will be comparatively low. In every instance of this kind the illumination of the display will be below a desirable point.

Therefore I have added to this invention a fourth or supplemental light circuit 38—40. The lamps 58 are white for the circuit 38—40. The rheostat 50 is the control means for the white light circuit 38—40. The rotary brush for rheostat 50 is actuated by means of a sprocket gear having 30 teeth. This makes a comparatively shorter exposure of the white lights but fills in the lapses of the color illumination. The point of insufficient color illumination does not occur regularly as to the time intervals, but since the three rheostats for the color circuits 26—28, 30—32, and 34—36 have a definite relationship in their relative speeds, it is obvious that the times of insufficient color illumination will have a mathematical relationship in their occurrence which will be divisible by a common factor. Due to this fact, it is possible to so gear the operation of the rheostat 50 for the white light circuit 38—40 so that it will always be in the proper position in its rotation at those factorable intervals when the white lamps 58 are needed.

Figure 4 is a diagram disclosing three waves 102, 104 and 106 which demonstrate the fluctuation of the various impedances and the resultant fluctuation of the various color circuits and also the relative time periods for the cycles of the various color circuits in their relative speeds of actuation. Also a fourth wave 108 is shown which demonstrates the interval at which the white light is interposed. The white light is shown interposed at those intervals when the combined intensities of the three color circuits fall below some predetermined current value. The wave 102 represents the relative fluctuation of the color circuit 26—28 as is particularly illustrated in Figure 5 of the drawings. Wave 104 represents the relative fluctuation of the color circuit 30—32 as is particularly illustrated in Figure 6. Wave 106 represents the relative fluctuation of the color circuit 34—36 as is particularly shown in Figure 7. Wave 108 represents the relative fluctuation of the white light circuit 38—40 which is particularly illustrated in Figure 8 of the drawings.

Referring to Figure 9 which represents the method of plotting a wave 110 for any of the light circuits. The uniformly distributed vertical lines of the chart represent the passage of time or the rate of speed of revolution of the rheostat pick up brush. The spaced horizontal lines represent the decrease in the steps of impedance and the corresponding increase in the luminosity of the circuit.

Figure 10 is a diagram disclosing three waves 102, 104, and 106 which demonstrate fluctuation of the various impedances and the resultant fluctuation of the various color circuits throughout a complete continuity of the color fluctuations or intensities, and the interspersal of the wave 108 representing the white light circuit fluctuations when the composite intensities of the color circuits have fallen below predetermined current values. Figure 4 discloses a partial continuity of the color fluctuations, 102, 104 and 106, while Figure 10 discloses a complete continuity of the color fluctuations on an enlarged scale. The diagram in Figure 10 discloses interspersals of the white lightwave 108 in a complete continuity of the color intensities. X represents the point where the composite illumination of the different color circuits is at a predetermined minimum and the relay 42 cuts in the white light illumination, represented by wave 108, to the composite illumination of the different color circuits. Z represents the point where the composite illumination of the different color circuits is of sufficient intensity so that the relay 42 cuts out the white light illumination, represented by wave 108, from the composite illumination of the different color circuits.

With the above understanding of the apparatus and its organization, the operation of the system as shown in Figures 1 to 10 inclusive will readily be understood from the following description:

When switch 25 is closed the system is ready to operate. The current is fed through conductor 20 to the rheostats 44, 46, 48 and 50 through conductors 45, 47, 49 and 51 respectively, and from the respective rheostats through conductors 74, 76, 78 and 80 to the lamp circuits 26—28, 30—32, 34—36 and 38—40. The electric motor 62 through sprocket chain 64 actuates the rotary brushes 86 over the commutators 84. The sprocket gear 65 for each rheostat is of a different size therefore the rheostats operate at different speeds. The rotary brush 86 for each commutator 84 is rotated from section 81 to section 79. That is the rotary brush 86 rotates from segment A to segment M in section 81 and on around to segment M and back to segment A in section 79 of the commutators 84. The stages of resistance are greater for each successive segment of section 81, while the stages of resistance are less for the successive segments of section 79. This movement of the brushes causes the intensities to gradually decrease, and then to gradually increase, because the stages of resistance gradually increase and then gradually decrease. The resultant fluctuations in the light circuits will produce every possible shade of color intensities.

As the electric current in the color circuits 26—28, 30—32 and 34—36 is at the beginning of the continuity very high, the white light circuit is not cut in the system by the relay switch 45. The color light circuits are first illuminated as they are connected in parallel through the relay 42 to the conductor 22. The rheostat 50 is operating at the same time as the other rheostats in the system but the relay switch 45 is not closed until the electric current in the three color circuits fall below a predetermined stage. At such times the relay switch 45 is closed thereby adding the white light circuit 38—40 to the display when the intensities of the color circuits are at the lowest illumination.

The purpose of electric signs is to attract attention to the display, but heretofore the electric signs have been glaring and repulsive, due to the sudden changes in the illumination. I have a control system for electric signs whereby the sign is more attractive and appealing because of the smooth blending of the various colors. It is also simpler in construction than any device in the prior art and can be adapted to signs of any size.

Although in accordance with the provision of the patent statutes the invention is described as embodied in concrete form, it is to be understood that the system shown in the drawings and described in the above specification is merely illustrative and that the invention is not limited thereto since alterations and modifications will readily suggest themselves to persons skilled in the art without departing from the true spirit of this invention or the scope of the annexed claims.

What I claim as new and desire to secure by Letters Patent of the United States is:

1. In a system for controlling a plurality of different color lights, and a supplemental white light, a plurality of separate circuits connected in parallel for said lights, a relay, intensity control means associated with each of said circuits for varying the intensities of illumination of said lights, the intensity control means for each circuit mounted for simultaneous rotation, one of said circuits being controlled by said relay, means for operating the said relay to add the said circuit to the system only when the composite current value of the color circuits is below a predetermined stage, and automatic means for actuating the intensity control means at different speeds.

2. In a system for controlling a plurality of color lights, a plurality of separate circuits connected in parallel for said lights, and a supplemental white light circuit connected in parallel, intensity control means associated with each of said circuits for varying the intensity of illumination of said light, the said intensity control means for each circuit mounted for simultaneous rotation, means for adding the supplemental or white light circuit to the system only when the composite current value of the color circuits is below a predetermined stage and means for actuating the intensity control means at varying speeds whereby there is a continuous blending of the component colors, and an automatic interspersal of a predetermined cycle of white light to that of the color intensities.

3. In a system for controlling a plurality of different color lights, and a white light, a plurality of separate circuits for said lights, intensity control means associated with each of said circuits for varying the intensities of illumination of said lights, the said intensity control means mounted for simultaneous rotation, one of the said intensity control means adapted to be rotated at a higher speed than the second intensity control means, the second intensity control means adapted to be rotated at a speed higher than the third intensity control means, and the fourth of the said intensity control means adapted to rotate at twice the speed of the said second intensity control means, the said fourth intensity control means having a relay control means in its circuit, and the relay control means adapted to add the fourth or white light circuit to the system only when the composite current value of the color circuits is below a predetermined stage and means for actuating the intensity control means.

4. In a system for controlling a plurality of different color lights, and a white light, a plurality of separate circuits for said lights, intensity control means associated with said circuits for varying the intensities of illumination of said lights, the said intensity control means mounted for simultaneous rotation, one of the said intensity control means adapted to be rotated at a higher speed than a second intensity control means so that the light fluctuation of the first intensity control means circuit is of less duration than the light fluctuation of the second intensity control means circuit, the second intensity control means adapted to be rotated at a speed higher than the third intensity control means so that the light fluctuation of the second intensity control means circuit is of less duration than the light fluctuation of the third intensity control means circuit, and the fourth intensity control means adapted to be rotated at twice the speed of the second intensity control so that the light fluctuation of the fourth intensity control means circuit is of less duration than the light fluctuations of the other circuits, and a relay having means responsive to the total current through the first three intensity control means and an armature in series with the fourth intensity control means whereby to add the light fluctuation of the fourth or white light circuit only when the composite fluctuation of the color intensity control means circuits is below a predetermined value.

5. In a system for controlling a plurality of different color lights, and a white light, a plurality of circuits for said lights, intensity control means associated with each of said circuits for varying the intensities of illumination of said lights, a common drive for the intensity control means having gear connections to each, a gear ratio of four to five to six to two and one-half for the intensity control means for the color lights, so that there will be a blending of the separate color intensities, and the white light circuit, having the gear ratio of two and one-half for the white light control means, means operated by the total current in the color light circuits for closing the circuit to the white lights only between predetermined limits of total current value in said color light circuits.

6. In a system for controlling a plurality of different color lights, a plurality of separate circuits for said lights, and a supplemental white light circuit connected in parallel, intensity control means associated with each of said circuits for varying the intensities of illumination of said lights, the intensity control means mounted for simultaneous rotation, means for adding the white light circuit to the system only when the composite current value of the color circuits is below a predetermined minimum, the said intensity control means operating at a gear ratio of four to five to six to two and one-half, whereby the resultant color intensities gradually rise and fall and there being a gradual blending of the white light intensity with that of the decreasing color intensities at predetermined intervals.

ROY L. COOPER.